United States Patent

Ohlsson

[15] 3,645,243
[45] Feb. 29, 1972

[54] FUEL MIXING AND VAPORIZING DEVICE FOR INTERNAL COMBUSTION ENGINES

[72] Inventor: Nils C. Ohlsson, Route 2, Box 534, Ashland, Wis. 54806

[22] Filed: Oct. 27, 1969

[21] Appl. No.: 869,627

[52] U.S. Cl. .................123/122 A, 123/119 B, 123/141, 48/180 R
[51] Int. Cl. ...................................F02m 31/10, F02m 29/04
[58] Field of Search...................123/141, 122, 122 A, 119 B; 48/180, 180 C, 180 M, 180 H, 180 B

[56] References Cited

UNITED STATES PATENTS

| | | | |
|---|---|---|---|
| 1,016,741 | 2/1912 | Fritz | 123/122 UX |
| 1,106,452 | 8/1914 | Ittner | 123/122 UX |
| 1,611,299 | 12/1926 | Wilka | 123/141 UX |
| 2,257,047 | 9/1941 | Finestone | 123/122 X |
| 2,618,541 | 11/1952 | Aceman et al. | 48/180 |
| 2,977,205 | 3/1961 | Austin | 123/141 |
| 3,088,447 | 5/1963 | Henderson | 123/119 B |
| 3,467,072 | 9/1969 | Toesca | 123/141 |

*Primary Examiner*—Al Lawrence Smith
*Attorney*—Strauch, Nolan, Neale, Nies & Kurz

[57] ABSTRACT

A fuel mixing and vaporizing device adapted to be connected between the carburetor and the intake manifold of an internal combustion engine and comprising a series of baffle plates spaced longitudinally apart in a heating and mixing chamber which is defined by a heat exchange jacket of tubular configuration. Fine mesh screens are disposed in the heating and mixing chamber between the baffles and the inlet end of the chamber. Hot water from the engine's coolant system is circulated through the jacket to preheat the fuel-air mixture which is drawn through the chamber by the suction created by operation of the engine. The screens provide a mechanical obstruction to create turbulence in the mixture entering the chamber, thereby mixing the fuel and air constituents. The baffle plates are configured and arranged to create more turbulence for mixing the fuel with the air, thereby causing the fuel droplets to break up into a fine mist which is deflected into intimate wiping contact with the heated interior wall surface of the jacket.

29 Claims, 5 Drawing Figures

PATENTED FEB 29 1972

3,645,243

INVENTOR.
NILS C. OHLSSON
BY
Strauch, Nolan, Neale,
Nies & Kurz
ATTORNEYS

FUEL MIXING AND VAPORIZING DEVICE FOR INTERNAL COMBUSTION ENGINES

FIELD OF INVENTION

This invention relates to fuel vaporizing and mixing devices for improving the efficiency of internal combustion engines.

BACKGROUND OF INVENTION

Prior to this invention, various types of fuel-air mixture preheaters have been proposed for vaporizing the fuel in the mixture before the mixture enters the intake manifold of the engine for the purpose of improving the efficiency of the engine. In a gasoline engine, the preheater is customarily connected between the outlet of the carburetor and the inlet of the intake manifold and is in the form of a heat exchanger which utilizes either the hot exhaust gases of the engine or the hot water in the engine's coolant system as a source of heat to vaporize the fuel. In some heat exchangers, baffles are arranged in the path of the steam of the fuel-air mixture for the purpose of retarding the flow of the fuel droplets within the heating chamber until sufficient vaporization has taken place. One example of such a fuel droplet-retarding baffling arrangement is described in the U.S. Letters Pat. No. 2,232,413 issued to R. Steskel on Feb. 18, 1941 for Internal Combustion Engines. In this patent, the baffles define a series of pockets within the vaporizing passage in which any condensed fuel collects and is subjected to intense heat and lowered pressure to assist in the vaporization of the fuel.

SUMMARY AND OBJECTS OF INVENTION

In contrast to the foregoing type of fuel vaporizing device, this invention contemplates a novel device for efficiently vaporizing the fuel droplets and mixing it with the air in the fuel-air mixture by means of a series of successive, annular baffle plates and fine mesh screens which are disposed in longitudinally spaced-apart relation within a heating and mixing chamber that is defined by a jacket through which hot water from the engine's coolant system is circulated. The baffles of this invention are in the form of orifice plates and in a preferred embodiment are alternately of concave (in the direction of flow) and frustoconical curvature.

Part of the fuel-air stream entering the heating and mixing chamber will longitudinally pass through the central aperture of the first baffle which is of concave configuration, and the other part of the stream will be deflected radially outwardly toward the heated jacket wall surface. Owing to the concave curvature of the baffle, one part of the deflected stream will reversely loop around to again intermix with the longitudinally flowing stream while the remainder will flow axially through circumferentially disposed apertures in the outer periphery of the concave baffle. This remainder will be deflected by the next baffle which is conical and converging in the direction of flow to cause the above-mentioned remainder to flow toward the central conical baffle opening at an acute angle with the longitudinal axis of effectively cross over the longitudinally flowing stream in the region of the central opening of the conical baffle.

Thus this baffling arrangement creates diverse flow paths to create a high degree of turbulence through the interaction of the fluid streams following these paths as well as deflecting some of the streams into intimate wiping contact with the heated, interior, heat exchanger jacket surface. The thusly created turbulence causes the longitudinally flowing stream to swirl and results in an increased mixing action, and increased mixing causes the fuel droplets to break up into a fine mist to achieve faster and more complete vaporization of the fuel.

The fine mesh screen is disposed at the outlet end of the heating chamber to provide a mechanical obstruction for further breaking up of the fuel droplets and intimately mixing the divided droplets with the air to enable a still higher degree of vaporization to be achieved.

This, in contrast to the type of heat exchanger in the above-mentioned Steskel patent, the baffle plates of this invention functioned on a basically different principle in that they cause mixing mainly by the swirling interaction of diversely directed streams of the mixture. According to this invention, therefore, relatively complete vaporization is achieved by three factors, namely the heat transfer from the hot fluid in the surrounding jacket, the swirling interaction of diversely flowing, baffle deflected streams, and the mechanical mixing and braking up of the fuel droplets by means of the fine mesh screens at the outlet end of the heating and mixing chamber.

With the foregoing in mind, it is a primary object of this invention to provide for a novel fuel mixing and preheating device wherein a high degree of vaporization of the fuel is achieved and wherein the vaporized fuel is intimately mixed with the air in the fuel-air mixture passing into the intake manifold of an internal combustion engine.

A further object of this invention is to provide a novel fuel mixing and vaporizing device which is characterized by simplicity of structure and economy of manufacture.

In connection with the preceding object the fuel mixing and vaporizing device of this invention contains no moving parts and is constructed so that it may easily be assembled in the form of an accessory for application to existing internal combustion engines and particularly to engines in automotive vehicles.

Further novel features, additional important objects and other significant advantages of this invention will become more fully apparent from the appended claims and as the detailed description proceeds in connection with the drawings described below.

DETAILED DESCRIPTION

Figure 1:
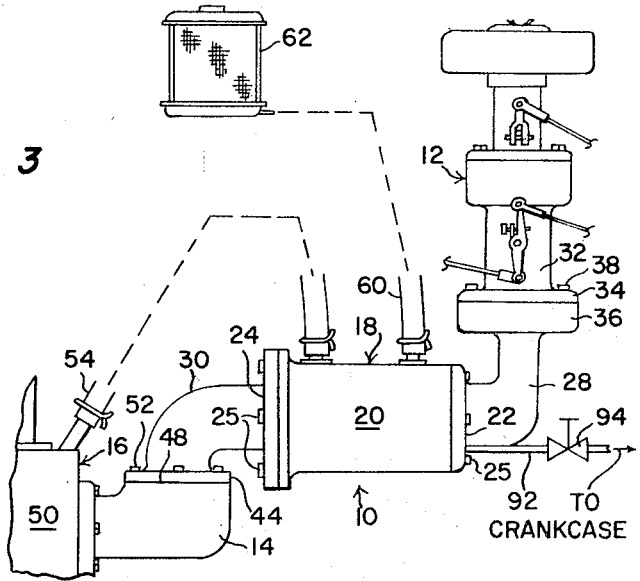
FIG. 1 is a partially schematic, fragmentary side elevation of an internal combustion engine incorporating the fuel vaporizing and mixing device of this invention.

Referring now to the drawings and more particularly to FIG. 1, the preferred embodiment of the fuel vaporizing and mixing device of this invention is generally designated at 10 and is shown to be interposed between a carburetor 12 and an intake manifold 14 of an internal combustion engine 16. Although the preferred embodiment of this invention is described in connection with a gasoline engine, it will be appreciated that it is applicable for vaporizing and mixing other fuels.

Device 10 comprises a casing or housing 18 which is formed by a horizontally disposed heat exchanger jacket 20 of elongated, tabular configuration and a pair of end plates which may be in the form of flanges 22 and 24. Flanges 22 and 24 are fixed as by machine screws 25 respectively to opposite ends of jacket 20. Jacket 20 and flanges 22 and 24 cooperate to enclose an elongated, cylindrically configured, preheating and mixing chamber indicated at 26 in FIG. 2. The interior, chamber defining wall surface of jacket 20 is preferably uniformly diametered.

The outlet port of carburetor 12 is connected to the inlet end of housing 18 by an elbow 28, and the outlet end of housing 18 is connected to the inlet port of manifold 14 by another elbow or fitting 30. As shown in FIG. 1, carburetor 12 is of conventional construction and has a housing 32 which is formed at the carburetor outlet port with an engine block mounting flange 34. Flange 34 is seated on a mating flange 36 and is fixed thereto by any suitable means such as machine screws indicated at 38. Flange 36 is fixed to the upper inlet end of elbow 28 by any suitable means such as welding. The opposite end of elbow 28 terminates in flange 22 which may be integral with or otherwise fixed to the elbow to provide a central, uniformly diametered inlet port 40 for introducing the fuel-air mixture into chamber 26 as shown in FIG. 2.

Figure 2:
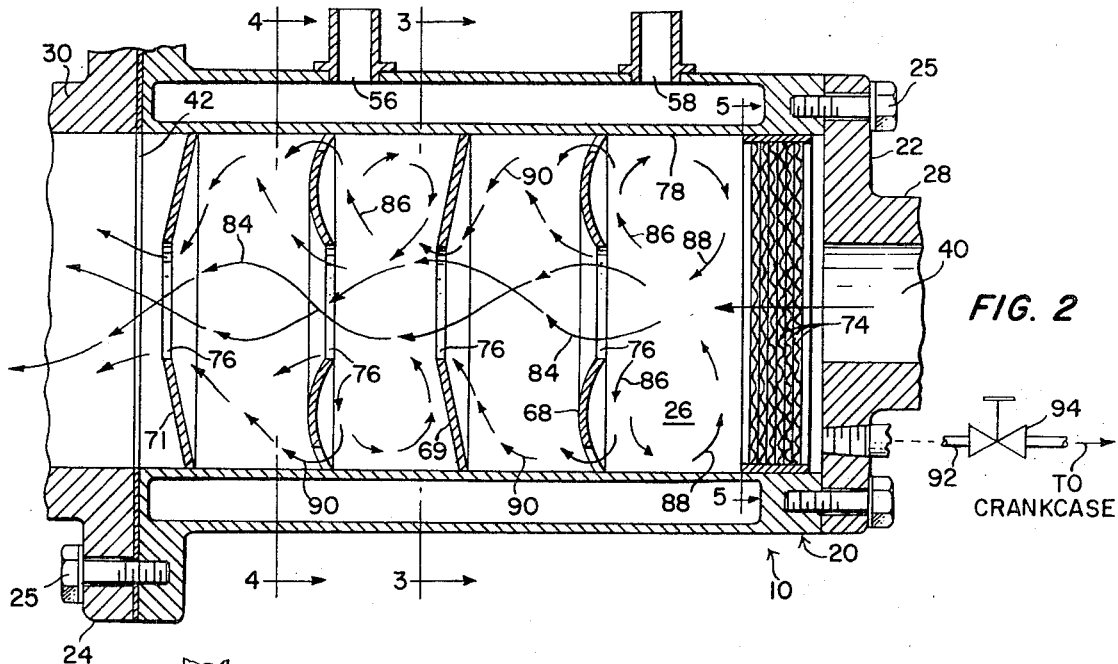
FIG. 2 is a longitudinal section of the fuel mixing and vaporizing device shown in FIG. 1.
Figure 3:
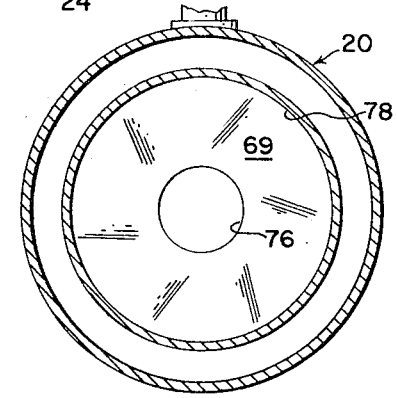
fIG. 3 is a section taken substantially along lines 3—3 of FIG. 2.

With continued reference to FIG. 2, flange 24 is integral with or otherwise suitably fixed to the inlet end of elbow 30 to provide a central, uniformly diametered outlet port 42 for chamber 26. Ports 40 and 42 are axially aligned with each other and also with the longitudinal axis of jacket 20.

As shown in FIG. 1, a flange 44, which is suitably fixed as by welding to the outlet end of elbow 30, seats on a mating flange surface 48 which is formed around the inlet port of manifold 14. Flange 44 is suitably, rigidly secured to manifold 14 by machine screws indicated at 52.

When device 10 is installed on an existing engine, flanges 36 and 44 are sized to properly mate with the carburetor flange and intake manifold flange face. Thus, installation of device 10 on an existing engine is simplified and is readily accomplished by first removing carburetor 12 from the intake manifold. Flange 44 is then secured to flange surface 48 on the engine block and carburetor 12 is mounted on flange 36 by securing flange 34 to flange 36.

As shown in FIGS. 1 and 2, the cooling water outlet on the block 50 of engine 16 is connected by a suitable hose and fitting assembly 54 to an inlet port 56 of jacket 20. The jacket outlet port, which is indicated at 58 in FIG. 2, is connected by a suitable hose and fitting assembly 60 to the inlet of a radiator 62 which forms a part of engine 16. Heated water, which is discharged from block 50, is introduced through port 56 for circulation through the annular interior of jacket 20 and is discharged through port 58 for return to radiator 62. Radiator 62 cools the water, and the cooled water is returned to engine block 50 in the usual manner.

As shown in FIG. 2, device 10 further comprises a series of fine mesh wire screens 74 and also a series of annular baffles 68, 69, 70 and 71, all of which are mounted within chamber 26. Baffles 68–71 are each in the form of orifice plates having a central circular opening 76. The openings 76 of baffles 68–71 are axially aligned with each other and are also coaxial with respect to the longitudinal axis of chamber 26 and of jacket 20. Baffles 68–71 are suitably fixed to the interior wall 78 of jacket 20 by any suitable means and are perpendicularly disposed with respect to the longitudinal axis of chamber 26. The outer peripheral edge of each of the baffles 68–71 is uniformly diametered to interfit with the interior, uniformly diametered cylindrical wall surface of wall 78 of jacket 20.

Still referring to FIG. 2, baffles 68–71 are spaced longitudinally apart by preferably substantially equal distances measured along the longitudinal axis of chamber 26. Also, the spacing between baffle 68 and flange 22 as taken along the longitudinal axis of chamber 26 is preferably substantially equal to the above-mentioned equal longitudinal distances between the baffles. Baffles 68–71 are successively arranged in a row in the order of their numbering with baffle 68 being the first in the row and nearest to inlet port 40.

Figure 4:
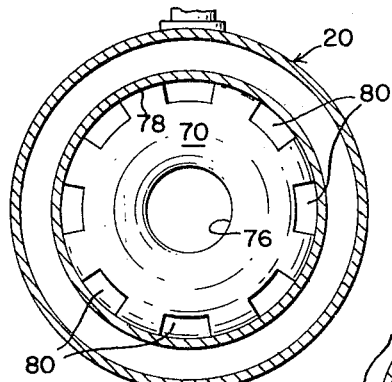
FIG. 4 is a section taken substantially along lines 4—4 of fIG. 2.

Baffles 68 and 70 are identical and are of concave configuration in the direction of fluid flow. The outer peripheries of these baffles are notched to form a series of circumferentially spaced-apart apertures 80 as best shown in FIG. 4. Apertures 80 are preferably spaced equiangularly apart around the outer peripheral edge of each of the two baffles. The purpose of apertures 80 will be explained shortly.

Baffles 69 and 71 are identical and are each of a frustoconical configuration which converges in the direction of fluid flow. Thus the array of baffles 68–71 are alternately concave and frustoconical for a purpose to be explained later on.

Figure 5:
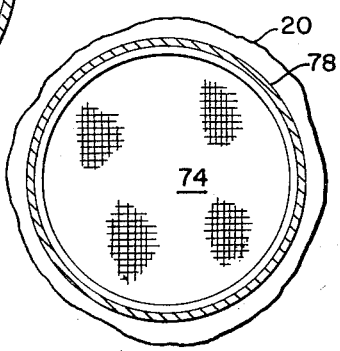
FIG. 5 is a section taken along lines 5—5 of FIG. 2.

As shown in FIG. 2, screens 74 are mounted in a row in any suitable manner preferably at the inlet end of chamber 26 and are disposed in uniformly closely spaced-apart relation at right angles to the longitudinal axis of chamber 26. Screens 74 are flat, parallel, and interfit with the interior periphery of wall 78 as best shown in FIG. 5. In this embodiment there are six identical screens of the character just described.

The fuel-air mixture provided by carburetor 12 is drawn serially through elbow 28, chamber 26, elbow 30, and intake manifold by the suction which is developed during operation of engine 16. The fuel droplets in the mixture before entering chamber 26 are relatively large and in such form are not readily vaporized.

Upon entering the chamber 26 the fuel-air mixture first passes through the series of screens 74 which provide finely apertured mechanical obstructions to impart turbulence to the stream and to intermix the fuel and air with the result that the unvaporized fuel droplets are broken up for ready vaporization as the mixture enters chamber 26. It will be appreciated that the mesh of screens 74 is sufficiently fine to provide the desired turbulence but no so fine as to objectionably impede the flow therethrough.

As shown in FIGS. 1 and 2, the inlet end of elbow 28 is somewhat smaller than port 40 at the outlet end thereof, and port 40 is somewhat larger than apertures 76, but considerably smaller than the diameter of chamber 26. As a result of this construction, the stream of the fuel-air mixture entering through port 40 will be large in cross section as compared with the diameter of aperture 76 in baffle 68. This stream will tend to diverge owing to the increasing cross section of the fluid flow passage between carburetor 12 and baffle 68. As a consequence, the outer peripheral portion of the incoming stream will impinge against baffle 68, and the central core of the stream will divide from the impinged portion and pass through aperture 76 of baffle 68 as indicated at 84 in FIG. 2.

The portion of stream impinging against baffle 68 will be reflected radially outwardly as indicated at 86 in FIG. 2. Owing to the concave curvature of baffle 68, one part of the deflected stream portion 86 will reversely loop around as indicated at 88 to gain intermix with the main stream of the mixture entering through port 40. The remainder of the deflected stream portion will separate from the reversely looping part 88 and will, as indicated at 90, pass axially through apertures 80 into the chamber region between baffles 68 and 69. It will thus be appreciated that baffle 68 directs the deflected stream portion into intimate wiping contact with the heated interior surface of jacket wall 78.

The divided stream portion 90 flowing between baffles 68 and 69 will be deflected by baffle 69 back toward the central stream portion 84, and owning to the fact that baffle 69 converges in the direction of fluid flow, stream portion 90 will be directed at an acute angle with respect to the longitudinal axis of chamber 26 to pass through aperture 76 of baffle 69 and thereby intermix with the central stream portion 84 which will also flow through the central aperture of baffle 69. The area in which stream portions 84 and 90 intermix is in the region of the aperture of baffle 69, and owing to the baffle-directed movement of stream portion 90, portion 90 tends to cross over with respect to the central stream portion 84 and to again flow toward the outer periphery of chamber 26 between baffles 69 and 70.

Some turbulence will mechanically be created by the impingement of the fuel-air mixture against baffles 68 and 69, but considerable turbulence will be created particularly by the interaction between the diversely flowing stream portions 90 and 84 and also by the interaction between the diversely flowing stream portions 88 and 84. This turbulence will be created in regions where stream portions 88 and 90 mix with stream portion 84, and owing to this interaction, a swirling turbulent motion will be imparted to the main stream of the mixture. The thusly created turbulence causes intimate mixing of the fuel and the air, and such mixing causes the fuel droplets to break up into a much finer mist that is capable of faster and more complete vaporization as compared with the relatively large droplets in the mixture entering chamber 26.

Since baffles 70 and 71 are respectively identical to baffles 68 and 69, essentially the same flow pattern, as just described in connection with baffles 68 and 69, will be repeated. As a result, still further turbulence will be imparted to the flowing fuel-air mixture to cause additional mixing to further break up the fuel droplets. It will be appreciated that additional interaction and consequential turbulence is created by the tendency of the central stream portion 84 to diverge after it passes through each central aperture 76 in the baffles.

The intimate mixing action achieved by the turbulence that is created in the mixture together with the deflection of stream portions into intimate wiping contact with the heated interior surface of jacket wall 78 results in a relatively high degree of vaporization of the fuel droplets in the mixture.

It was surprisingly found through experimentation that the presence of screens 74 contributes significantly toward improved engine efficiency. In this connection tests were conducted with the preferred embodiment in an automobile gasoline engine. The parts of device 10 for such an engine were constructed with the following dimensions:

Diameter of chamber 26 and outer diameter of baffles 68–71 –2⅞ inches
Diameter of apertures —1¼
Diameter of port 40
Longitudinal spacing between baffles 68–71
Mesh of screens 74
Length of chamber 26

The size of apertures 80 should preferably be small as compared to the diameter of baffle 70 so as to hold the flow of the mixture as close as possible to the heated wall of chamber 26, yet should be large enough to permit substantial flow from one side of baffles 70 to the other. In the embodiment tested in the above-mentioned test, the mean depth of the apertures 80 in a radial direction was three-eighths inch with the total area of all six apertures being approximately 22 percent of the entire projected area of the respective baffles 70.

In first tests of the engine without device 10, it was found that approximately 10 gallon of gasoline was consumed in approximately 12.4 miles. In a second set of tests, device 10 was installed on the engine in the manner described herein, and with device 10 the mileage increased significantly to approximately 19.8 miles per gallon of gasoline consumed. The, screens 74 were removed from device 10, and a third set of tests was conducted in which mileage decreased to approximately 15.2 miles per gallon of gasoline consumed.

From the foregoing it is evident that the improved engine performance is attributable to three interrelated features of applicant's device 10: the preheating of the fuel-air mixture, baffles 68–71, and screens 74.

It has also been found that the engine performance can be even further improved by injecting the gaseous crankcase fumes into the chamber 26 at the inlet end thereof. Accordingly a pipe or other suitable duct 92 is provided which leads from the crankcase to the inlet end of device 10. Because the fumes from the crankcase are hot they aid in the further vaporization of the fuel mixture and have the added benefit of reducing air pollution from crankcase emissions. A valve 94 is provided to permit adjustment and control of the amount of crankcase fumes which are injected into chamber 26. Tests have shown injecting crankcase fumes into chamber 26 in the proper amount has resulted in an increase of 1.1 miles per gallon of gasoline consumed over the performance of the invention when used without the provision of crankcase fume injection.

From the foregoing description of device 10, it also will be appreciated that device 10 contains no moving parts, is easy and economical to manufacture, can be readily made in the form of an accessory for attachment to existing engines without any significant modification of the power plant, and provides for a significant increase in mileage and consequent savings on fuel.

It is to be understood that while the specific form of the invention herein described utilizes the engine cooling water to provide heat to aid in vaporization of the air-fuel mixture, other sources of heat may be effectively utilized. For example, in air cooled engines the heat from the exhaust may provide the necessary heat. In such a case the inlet port 56 of jacket 20 would be connected to the exhaust and the outlet 58 vented to atmosphere.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A mixing and vaporizing device adapted to be connected between a carburetor and an intake manifold of an internal combustion engine for vaporizing fuel and mixing it with the air in a fuel-air mixture provided by said carburetor, and device comprising means defining a heating and mixing chamber having an inlet port adapted to be connected to the outlet of said carburetor and an outlet port adapted to be connected to the inlet of said manifold to provide a fluid flow passage for directing said mixture from said carburetor to said manifold, screen means disposed within said chamber having a sufficiently fine mesh to provide a mechanical obstruction for creating turbulence and to reduce the size of fuel particles in the fuel-air mixture flowing through said chamber, baffle means disposed within said chamber for further developing turbulence in the fuel-air mixture flowing through said chamber to said outlet port, and means for applying heat to said chamber to vaporize the fuel in said mixture, said screen means and said baffle means being arranged in a row along the path of flow of said mixture through said chamber, said screen means being disposed between said inlet port and said baffle means, and said fluid flow passage being configured to direct all of the fuel-air mixture entering through said inlet port first through said screen means, then through the region of said chamber where the mixture impinges against said baffle means, and then to said outlet port.

2. The mixing and vaporizing device defined in claim 1 wherein said screen means comprises a plurality of flat closely axially spaced-apart layers of screen extending along parallel planes that transversely intersect the longitudinal axis of said chamber.

3. The mixing and vaporizing device defined in claim 1 wherein said baffle means comprises a plurality of annular baffles arranged in a row along the flow path of the mixture entering said chamber and being configured to divide the mixture entering said chamber into diversely flowing streams which interact to produce turbulence and consequent intermixing of the fuel and the air in said mixture.

4. The mixing and vaporizing device defined in claim 3 wherein said chamber is of substantially cylindrical configuration with said inlet and outlet ports being disposed at opposite ends of said chamber, and wherein said baffles and said screen means are disposed in aligned, axially spaced apart relation with respect to each other.

5. The mixing and vaporizing device defined in claim 4 wherein said screen means comprises a plurality of flat, axially spaced-apart layers of screen extending perpendicularly with respect to an axis about which said baffles coaxially extend.

6. The mixing and vaporizing device defined in claim 5 wherein said means providing said chamber comprises an annular jacket having a hollow interior, and wherein said means for applying said heat comprises means for circulating a heated fluid medium through said hollow interior to effect a transfer of heat through a wall of said jacket to the mixture flowing through said chamber.

7. The mixing and vaporizing device defined in claim 3 wherein said means defining said chamber comprises a jacket having a hollow interior to define a compartment having inlet and outlet openings adapted to be connected to the coolant system of said internal combustion engine to provide for the circulation of hot water from said cooling system through said compartment, said jacket being formed with an inner, annular wall which delimits the outer periphery of said chamber, said baffles and said screen means being (a) axially aligned in said chamber in coaxial relation with the longitudinal axis thereof and (b) in alignment with said inlet and outlet ports.

8. The mixing and vaporizing device defined in claim 7 comprising inlet and outlet fittings respectively fixed to opposite ends of said jacket, said inlet fitting having a flange at its inlet end which is sized for mating connection to a flange on an existing carburetor, and said outlet fitting having a flange at its outlet end which is sized for mating attachment to a flange surface on an existing intake manifold whereby the assembly of said inlet and outlet fittings, said jacket, said baffle means, and said screen means are adapted for detachable assembly in an existing internal combustion engine.

9. The mixing and vaporizing device of claim 1 together with means to direct crankcase fumes into the mixture flowing through said device to aid in the further vaporization of said mixture.

10. The mixing and vaporizing device defined in claim 1 wherein said baffle means is configured to enable the central core of the stream of fuel-air mixture to pass from said inlet port to said outlet port without impingement against a baffling surface.

11. The mixing and vaporizing device defined in claim 10 wherein said baffle means consists of a plurality of annular baffles arranged in a row along the flow path of the mixture passing through said chamber from said inlet port to said outlet port, said annular baffles being the only baffles between said screen means and said outlet port.

12. The mixing and vaporizing device defined in claim 11 wherein said annular baffles define central openings that axially align with each other.

13. The mixing and vaporizing device defined in claim 12 wherein the transverse cross section of said chamber is significantly greater than that of said inlet port to enable a part of the fuel-air mixture entering said chamber from said inlet port to diverge for impingement against the first one of said annular baffles in said row.

14. The mixing and vaporizing device defined in claim 1 wherein said baffle means comprises a plurality of baffles arranged in a single row between said inlet and outlet ports, said baffles providing the only baffling surfaces between said inlet and outlet ports for deflecting the fuel-air mixture flowing from said inlet port to said outlet port, at least the one of said baffles that is closest to said inlet port being of annular configuration.

15. The mixing and vaporizing device defined in claim 14 wherein said one of said baffles defines a central opening that enables the central core of the stream of said mixture to flow through said one baffle without deflection.

16. A mixing and vaporizing device adapted to be connected between a carburetor and an intake manifold of an internal combustion engine for vaporizing fuel and mixing it with the air in a fuel-air mixture provided by said carburetor, said device defining a heating and mixture provided by said carburetor, said device defining a heating and mixing chamber having an inlet port adapted to be connected to the outlet of said carburetor and an outlet port adapted to be connected to the inlet of said manifold to provide a fluid flow passage for directing said mixture from said carburetor to said manifold, baffle means disposed within said chamber for developing turbulence in the fluid-air mixture flowing through said chamber to said outlet port, and means for applying heat to said chamber to vaporize the fuel in said mixture, said baffle means comprising a plurality of annular baffles arranged in row between said inlet and outlet ports, said annular baffles providing the only baffling surfaces between said inlet and outlet ports, and at least two consecutive ones of the annular baffles in said row having different, first and second predetermined configurations for creating diversely flowing streams of said mixture to produce turbulence and consequent intermixing of the fuel and the air in said diversely flowing streams.

17. The mixing and vaporizing device defined in claims 16 wherein said first configuration is concave in the direction of flow towards said outlet port, and wherein said second configuration is frustoconical and converges in the direction of flow toward said outlet port.

18. The mixing and vaporizing device defined in claim 17, there being at least one annular baffle of said first configuration disposed upstream from said at least one annular baffle of said second configuration.

19. A mixing and vaporizing device adapted to be connected between a carburetor and an intake manifold of an internal combustion engine for vaporizing fuel and mixing it with the air in a fuel-air mixture provided by said carburetor, said device comprising means defining a heating and mixing chamber having an inlet port adapted to be connected to the outlet of said carburetor and an outlet port adapted to be connected to the inlet of said manifold to provide a fluid flow passage for directing said mixture from said carburetor to said manifold, screen means disposed within said chamber and having a sufficiently fine mesh to provide a mechanical obstruction for creating turbulence and to reduce the size of fuel particles in the fuel-air mixture flowing through said chamber, baffle means disposed within said chamber for further developing turbulence in the fuel-air mixture flowing through said chamber, and means for applying heat to said chamber to vaporize the fuel in said mixture, said baffle means comprising a plurality of annular baffles arranged in a row along the flow path of the mixture entering said chamber and being configured to divide the mixture entering said chamber into diversely flowing streams which interact to produce turbulence and consequent intermixing of the fuel and the air in said mixture, said baffles being alternately of first and second configurations, with said first configuration being concave in the direction of flow toward said outlet port, and with said second configuration being frustoconical and converging in the direction of flow toward said outlet port, there being at least one annular baffle with said first configuration disposed upstream from at least one annular baffle with said second configuration, said at least one annular baffle with said first configuration having apertures spaced circumferentially around its outer periphery to provide for the flow of a part of the mixture into the space between it and said at least one baffle of said second configuration.

20. The mixing and vaporizing device defined in claim 19 wherein said baffles of said first and second configurations are axially aligned and are spaced axially apart from each other.

21. The mixing and vaporizing device defined in claim 20 wherein said baffles of said first and second configurations are axially aligned with said inlet port.

22. The mixing and vaporizing device defined in claim 21 wherein said inlet port is larger than the central opening through said at least one baffle of said first configuration.

23. A mixing and vaporizing device adapted to be connected between a carburetor and an intake manifold of an internal combustion engine for vaporizing fuel and mixing it with the air in a fuel-air mixture provided by said carburetor, said device comprising means defining a heating and mixing chamber having an inlet port adapted to be connected to the outlet of said carburetor and an outlet port adapted to be connected to the inlet of said manifold to provide a fluid flow passage for directing said mixture from said carburetor to said manifold, screen means disposed within said chamber having a sufficiently fine mesh to provide a mechanical obstruction for creating turbulence and to reduce the size of fuel particles in the fuel-air mixture flowing through said chamber, baffle means disposed within said chamber for further developing turbulence in the fuel-air mixture flowing through said chamber, and means for applying heat to said chamber to vaporize the fuel in said mixture, said baffle means comprising a plurality of annular baffles arranged in a row along the flow path of the mixture entering said chamber and being configured to divide the mixture entering said chamber into diversely flowing streams which interact to produce turbulence and consequent intermixing of the fuel and the air in said mixture, said means defining said chamber comprising a wall means defining an internal compartment and having a cylindrical internal surface delimiting said chamber, said means applying said heat comprising means for circulating a heated fluid medium through said compartment to transfer heat to the mixture in said chamber, said baffles being in the form of orifice plates and being alternately of first and second configurations with at least one baffle of said first configuration being disposed upstream and in axial alignment with at least one baffle of said second configuration, said at least one baffle of said first configuration being concave in the direction of flow toward said outlet port to deflect a portion of the mixture entering said chamber radially outwardly into intimate wiping contact with said wall and to reversely loop said portion to cause it to flow inwardly toward the stream of the mixture flowing toward said at least one baffle of said first configuration for diverse and turbulent interaction therewith, said at least one baffle of said first configuration being formed with circumferentially spaced apertures around its outer periphery to provide a flow path for guiding a part of said deflected portion axially into the space between said at least one baffle of said first configuration and said at least one baffle of said second configuration in close wiping contact with said wall, said second configuration being frustoconical and converging in the direction of flow through the central openings of said baffles to direct said part of said deflected portion inwardly toward the stream of the mixture flowing through the central opening of said at least one baffle of said second configuration to diversely and turbulently intersect said stream in the region where it flows through the central opening of said at least one baffle of said second configuration.

24. A mixing and vaporizing device adapted to be connected between a carburetor and an intake manifold of an internal combustion engine for vaporizing fuel and mixing it with the air in a fuel-air mixture provided by said carburetor, and device comprising means defining a heating and mixing chamber having an inlet port adapted to be connected to the outlet of said carburetor and an outlet port adapted to be connected to the inlet of said manifold to provide a fluid flow passage for directing said mixture from said carburetor to said manifold, screen means disposed within said chamber having a sufficiently fine mesh to provide a mechanical obstruction for creating turbulence and to reduce the size of fuel particles in the fuel-air mixture flowing through said chamber, baffle means disposed within said chamber for further developing turbulence in the fuel-air mixture flowing through said chamber, baffle means disposed within said chamber for further developing turbulence in the fuel-air mixture flowing through said chamber to said outlet port, and means for applying heat to said chamber to vaporize the fuel in said mixture, said baffle means comprising a plurality of annular baffles arranged in a row along the flow path of the mixture entering said chamber and being configured to divide the mixture entering said chamber into diversely flowing streams which interact to produce turbulence and consequent intermixing of the fuel and the air in said mixture, said baffles being alternately of first and second configurations, with said first configuration being concave in the direction of flow toward said outlet port, and with said second configuration being frustoconical and converging in the direction of flow toward said outlet port.

25. The mixing and vaporizing device defined in claim 24, there being at least one annular baffle with said first configuration disposed upstream from one annular baffle of said second configuration.

26. A mixing and vaporizing device adapted to be connected between a carburetor and an intake manifold of an internal combustion engine for vaporizing fuel and mixing it with the air in a fuel-air mixture provided by said carburetor, said device comprising means defining a heating and mixing chamber having an inlet port adapted to be connected to the outlet of said carburetor and an outlet port adapted to be connected to the inlet of said manifold to provide a fluid flow passage for directing said mixture from said carburetor to said manifold, screen means disposed within said chamber having a sufficiently fine mesh to provide a mechanical obstruction for creating turbulence and to reduce the size of fuel particles in the fuel-air mixture flowing through said chamber, baffle means disposed within said chamber for further developing turbulence in the fuel-air mixture flowing through said chamber to said outlet port, and means for applying heat to said chamber to vaporize the fuel in said mixture, said baffle means providing the only baffling surfaces between said inlet and outlet ports, and said baffle means being configured to enable the central core of the stream of said fuel-air mixture to pass from said inlet port to said outlet port without impinging against said baffling surfaces.

27. The mixing and vaporizing device defined in claim 26 wherein said baffle means comprises a plurality of annular baffles arranged in a row along the flow path of the mixture flowing through said chamber from said inlet port to said outlet port, said annular baffles being the only baffles between said inlet port and said outlet port.

28. The mixing and vaporizing device defined in claim 27 wherein said annular baffles define central openings that axially align with each other.

29. A mixing and vaporizing device adapted to be connected between a carburetor and an intake manifold of an internal combustion engine for vaporizing fuel and mixing it with the air in a fuel-air mixture provided by said carburetor, said device comprising means defining a heating and mixing chamber having an inlet port adapted to be connected to the outlet of said carburetor and an outlet port adapted to be connected to the inlet of said manifold to provide a fluid flow passage for directing said mixture from said carburetor to said manifold, screen means disposed within said chamber having a sufficiently fine mesh to provide a mechanical obstruction for creating turbulence and to reduce the size of fuel particles in the fuel-air mixture flowing through said chamber, baffle means disposed within said chamber for further developing turbulence in the fuel-air mixture flowing through said chamber to said outlet port, and means for applying heat to said chamber to vaporize the fuel in said mixture, said baffle means comprising a plurality of baffles arranged in a row along the flow path of the mixture flowing through said chamber to said outlet port and being configured to divide the mixture entering said chamber into diversely flowing streams which interact to produce turbulence and consequent intermixing of the fuel and the air in said mixture, at least two consecutive ones of said baffles in said row being of annular configuration to each define a central opening through which the core of the stream of said mixture flows without deflection.

* * * * *

UNITED STATES PATENT OFFICE
CERTIFICATE OF CORRECTION

Patent No. 3,645,243　　　　　　Dated　Feb. 29, 1972

Inventor(s)　　　Nils C. Ohlsson

It is certified that error appears in the above-identified patent and that said Letters Patent are hereby corrected as shown below:

Column 1, line 21, change "steam" to -- stream --.

Column 1, line 74, change "this" to -- thus --.

Column 4, line 14, change "no" to -- not --.

Column 5, line 33, change "10" to -- one --.

Column 5, line 37, change "The" to -- Then --.

Column 6, line 14, Claim 1, change "and" to -- said --.

Column 9, line 32, Claim 24, change "and" first occurrance to -- said --.

Cancel lines 43 through 51 and substitute the following -- chamber to said outlet port, and means for applying heat to said chamber to vaporize the fuel in said mixture, said baffle means comprising a plurality of annular baffles arrange in a row along the flow path of the mixture entering said chamber and being configured to divide the mixture entering said chamber into diversely flowing streams which interact to produce turbulence and consequent intermixing of --.

Signed and sealed this 11th day of July 1972.

(SEAL)
Attest:

EDWARD M. FLETCHER, JR.
Attesting Officer

ROBERT GOTTSCHALK
Commissioner of Patents